UNITED STATES PATENT OFFICE

2,227,876

STEROID DERIVATIVES WITH NUCLEAR SUBSTITUTED NITROGEN

Carel Christof Bolt, Amsterdam, Netherlands, assignor to the firm of N. V. Organon, Oss, Netherlands No Drawing. Application October 12, 1938, Serial No. 234,719. In the Netherlands October 16, 1937

12 Claims. (Cl. 260—269)

This invention relates to new and useful derivatives of steroids.

It is an object of this invention to provide new steroid derivatives having a nitrogen atom substituted for a carbon atom belonging to the cyclopentanopolyhydrophenanthrene nucleus.

Another object is to provide for a general process by which such nitrogen containing derivatives may be prepared.

This process I will now describe in detail:

As a starting material I choose the oxime of a keto acid from the steroid series in which the position of the ketiminogroup (=N—OH) and the carboxylgroup (—COOH) are such that a reaction between these groups will be possible from a geometrical point of view.

Such oximino acids may e. g. be obtained according to the methods of Windaus, Ber. 39, 2010, (1906) and Dorée and Gardner, J. Chem. Soc., 93, 1330, (1908) by ozonisation of cholestenone and subsequent reaction with hydroxylamine.

Analogous oximino acids may be prepared from other sterols or steroids, e. g. testosterone, F-keto-cholesterol.

One of the features of the invention consists in subjecting said oximino acids (I) to a reduction whereby compounds of the lactam type (II) are formed.

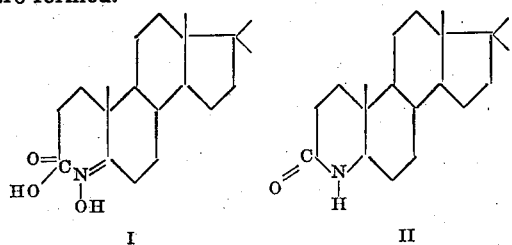

These lactams may be converted into acyl or alkyl derivatives by the action of acylating or alkylating agents.

Another feature is that in these lactams the keto groups are reduced to secondary hydroxyl groups (III) or even to methylene groups (IV), and the products obtained may again be acylated or alkylated.

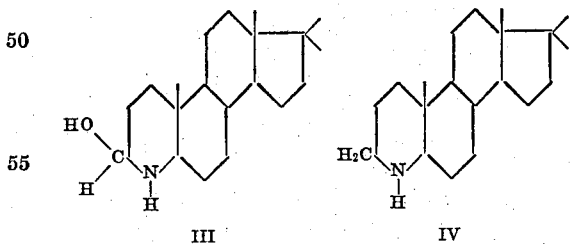

The reduction may be carried out in such a way that double bonds existing in the molecule are not affected.

The products obtained are useful either as therapeutics or as intermediates for the production of same.

In order to secure a clear understanding the following examples will be given by way of illustration; the invention, however, is not to be restricted thereto.

1. Preparation of lactam from cholestenone

Cholestenone is ozonised according to Dorée and Gardner and the acid thus obtained is transformed into the oxime (V) according to Windaus. M. P. 190–191°.

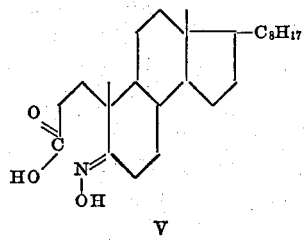

V 8, 4 g. of this oxime are dissolved in 200 cm. absolute ethanol the solution is boiled with reflux and 18 g. of metallic sodium are rapidly added. First the sodium salt of the oximino carboxylic acid precipitates but in the course of the reaction it dissolves again. When all the sodium has disappeared the solution is diluted with 2 liters of water. After acidification with acetic acid the solution is extracted with ether (3 times with 200 cm³.). The ethereal solution is thoroughly washed with sodium carbonate solution and water and dried with sodium sulfate. After evaporation the lactam (VI) is recrystallised from ether or methanol. Yield 4,15 g.=50% of the theory. M. P. 246–248°; after repeated crystallization from methanol the M. P. is 253-255°.

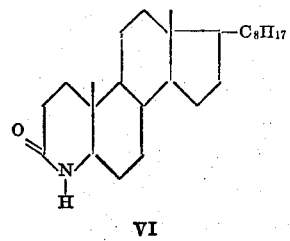

VI

Analysis: C:80.63, 80.49; H:11.69, 11.71; N:3.87, 3.83; calculated for $C_{26}H_{45}ON$: C:80.55; H:11.71; N:3.62

$[\alpha]_D^{18} = +44°$ [in pyridine]

The lactam crystallises in small needles and is soluble in all common organic solvents except petroleum ether; it is insoluble in water. Acetyl compound: 400 mg. of the lactam are boiled for 2 hours with 15 cm³. dry pyridine and 5 cm³. acetic acid anhydride. Thereupon the solution is evaporated to dryness and the residue (VII) crystallised from methanol. Yield 380 mg.; M. P. 136–137°.

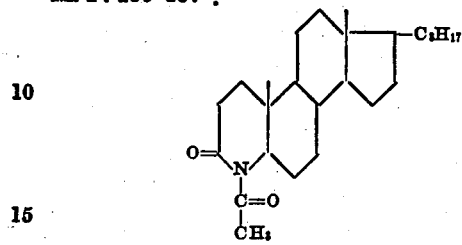

VII

Analysis: C:78.41, 78.49; H:10.85, 10.80 calculated for C₂₈H₄₇O₂N: C: 78.26; H: 11.02.

2. *Reduction of lactam from Example 1*

500 mg. of the lactam prepared according to Example 1 are dissolved in 40 cm³. amyl alcohol and the solution is treated, while boiling with reflux, with 2 g. of sodium. After the sodium is dissolved the solution is poured in water whereupon the amyl-alcohol is eliminated by steam distillation. The solution is extracted with ether the ethereal solution is washed with water and dried with sodium sulfate. After evaporation of the ether the new compound (VIII) obtained is recrystallised from methanol. Yield: 300 mg.(=62% of the theory). After repeated crystallisation from methanol the compound melts at 116–117°.

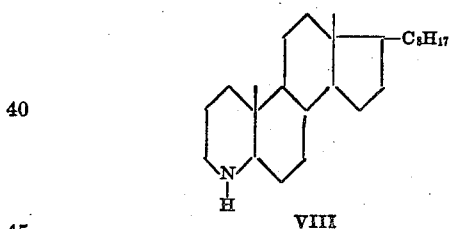

VIII

Analysis: C:83.64, 83.79; H:12.58, 12.58; N: 3.90, 3.82; calculated for C₂₆H₄₇N: C: 83.57; H: 12.68; N:3.75

$[\alpha]_D = +48°$ [pyridine].

Acetyl compound: 100 mg. of the compound are boiled with 4 cm³. of pyridine and 1 cm³. of acetic acid anhydride. After evaporation in vacuo till dryness the residue is dissolved in ether and the ethereal solution is washed with dilute sulfuric acid and with water. After drying with sodium sulfate and evaporation of the ether the residue (IX) is recrystallised from methanol. The yield is 95 mg., leaflets melting at 132–132,5°.

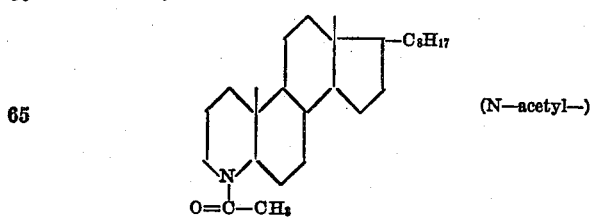

IX

Analysis: C:81.01, 80.89; H:11.84, 11.75; calculated for C₂₈H₄₉ON: C: 80.90; H:11.88.

Propionyl compound: This is prepared from 100 mgs. analogous to the acetyl compound with 1 cm³. propionic acid anhydride. The yield is 80 mg. of the N-propionyl compound (X) melting at 113–116°.

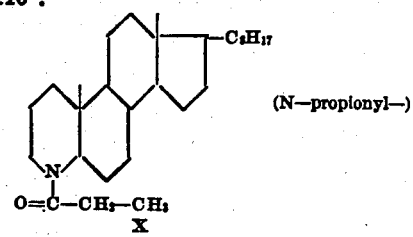

X

N-methyl compound: 150 mg. of the compound are boiled with 1,5 cm³. of methyl iodide whereupon the addition compound is treated in an ethereal solution with an aqueous solution of sodium carbonate. Some carbon dioxide is evolved. The ethereal solution is washed with water, dried with sodium sulfate and evaporated to dryness. The residue is recrystallised from methanol whereby 85 mg. of the N-methyl compound (XI) are obtained. M. P. 61–62° C.

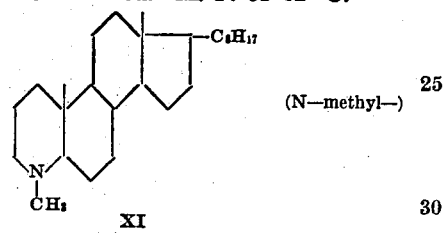

XI

3. *Catalytic reduction of oximino carboxylic acid to corresponding lactam*

840 mg. of the oximino carboxylic acid from cholestenone (cf. Example 1) are dissolved in 50 cm³. glacial acetic acid. 200 mg. finely divided platinum (prepared according to Willstätter) are added and the mixture is shaken with hydrogen. After 1 hour 90 cm³. of hydrogen have been taken up. The platinum is filtered off and the glacial acetic acid is evaporated in vacuo. The residue is recrystallized from methanol. The yield is 400 mg. The product is identical with the lactam obtained according to Example 1. From the mother liquor 275 mg. of an amino carboxylic acid are obtained.

4. *Lactam from 7-keto-cholesterol*

The process of Example 1 is carried out with 7-ketocholesterol which can be obtained by oxidation with CrO₃ of cholesterolacetate (Windaus et al., Ann. 520, 98, (1935)). This is ozonised, the keto carboxylic acid is transformed into the oxime (XII) and this is reduced to the lactam. (XIII) The latter is obtained in the form of a difficultly crystallisable syrup.

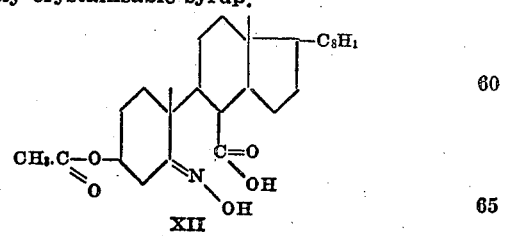

XII and

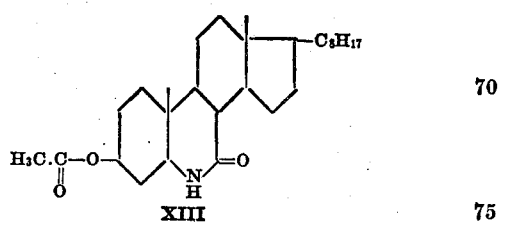

XIII

5. Lactam from testosterone. (androstene-4-one-3-ol-17)

(a) Ozonisation is effected in the usual way with 2 g. of testosterone. The keto carboxylic acid melts at 206, 5–207°. Yield 820 mg. (=44%);

(b) the oxime (XIV) is prepared by dissolving 700 mg. keto acid in 30 cm³. ethanol and boiling with 1 g. KOH and 300 mg. of hydroxylamine-hydrochloride in 20 cm³. of water. After acidification with acetic acid, evaporation and addition of water the oxime crystallises in small needles and may be recrystallised from ethanol-water (9:1). M. P. 199–202°; yield 720 mg.;

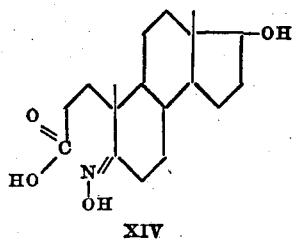

XIV (c) reduction of oxime to lactam.

700 mg. of the oxime are dissolved in 60 cm³. of absolute ethanol and, while boiling, 6 g. of sodium are added. After dissolution of the sodium the mixture is acidified with acetic acid, thereupon made alkaline with sodium carbonate and extracted eight times with 50 cm³. of ether. After evaporation of the combined ether extracts 320 mg. of the lactam (XV) remain. After repeated crystallisation the M. P. is 262–263°.

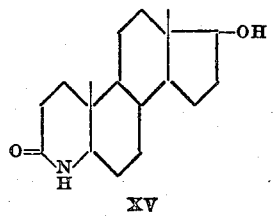

XV $[\alpha]_D^{18} = +33°$ [pyridine].

Analysis: C:74.31, 74.40; H:9.94, 9.97; N:4.93, 5.01; calculated for $C_{18}H_{29}O_2N$: C:74.18; H:10.03; N:4.81.

The lactam is easily soluble in all common organic solvents except petroleum ether. It is insoluble in water.

(d) Diacetyl compound of the lactam:

30 mg. of the lactam are acetylated in 1 cm³. of pyridine with 1 cm³. of acetic acid anhydride. Recrystallisation of the product from methanol-water yields 12 mg. of a diacetyl compound (XVI) melting at 164–167°. It crystallises in needles and is easily soluble in the common organic solvents except petroleum ether and gasoline.

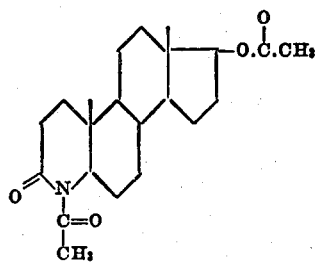

XVI

6. Reduction of the lactam from testosterone (a) To a solution of 150 mg. of the lactam from Example 5 (c); in 40 cm³. of amyl alcohol are added 3 g. of sodium. In the course of the reaction a further 20 cm³. of amyl alcohol are added. After dissolution of the sodium the amyl alcohol is eliminated with steam. The reduced lactam (XVII) is taken up in ether the ethereal solution is washed with water and dried with sodium sulfate. After evaporation of the ether the residue is recrystallised from methanol. Yield 80 mg. M. P. 202–203°.

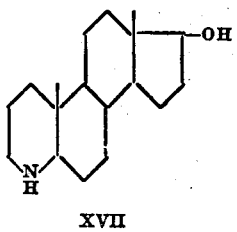

XVII $[\alpha]_D^{18} = +0.28°$ [pyridine]

Analysis: C:78.01, 77.90; H:11.18, 11.08; N:5.22, 5.08; calculated for $C_{28}H_{31}ON$: C:77.92; H:11.26; N:5.05.

The new substance which crystallises in beautiful quadratic plates is soluble in common organic solvents except petroleum ether and insoluble in water. In a high vacuum (0.001 mm. Hg.) it may be sublimated between 140–150°.

(b) Diacetyl compound.

50 mg. of the substance are acetylated with 1 cm³. of acetic acid anhydride and 3 cm³. of pyridine. After evaporation to dryness in vacuo the residue (XVIII) is crystallised once from methanol-water and twice from petroleum ether. Thin plates melting at 180.5–181.5°; yield 35 mg.

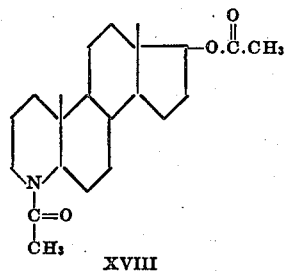

XVIII

Analysis: C:73.29; H:9.72; calculated for $C_{22}H_{35}O_3N$: C:73.09; H:9.76.

As indicated by the examples given above, the products of my invention will vary according to the degree of reduction of the lactam derivative, and the nature and position of the substituents. These compounds may have the following structural formula:

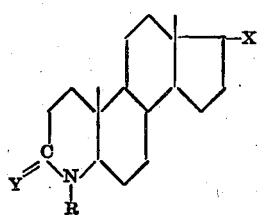

in which Y is a group from the class consisting of

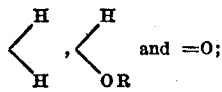

R is a group from the class consisting of H, acyl, alkyl; X is a group from the class consisting of OH, O-acyl, O-alkyl, and a carbon containing a side chain.

Similar compounds may be obtained with the n atom in the 6 position in the manner described in Example 4. Such compounds may be substituted in the same manner as described in the other examples given herein and the compounds obtained will correspond to the following structural formula:

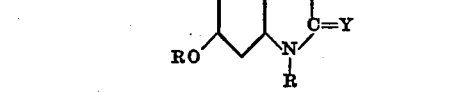

in which Y is a group from the class consisting of

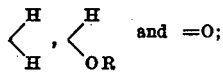

and R is a group from the class consisting of H, acyl and alkyl.

The numbering referred to herein is that commonly used in describing steroid compounds and corresponds to that described in "Hackh's Chemical Dictionary", 1937 edition, page 218. This numbering may be illustrated in the following manner:

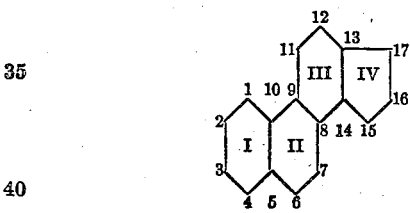

Free lines represent methyl groups in accordance with customary practice unless otherwise occupied.

What I claim is:

1. As new compositions of matter lactams, and derivatives thereof of compounds having a cyclopentanopolyhydrophenanthrene nucleus having the general formula $C_{18}H_{27}NXYR$ and the structure

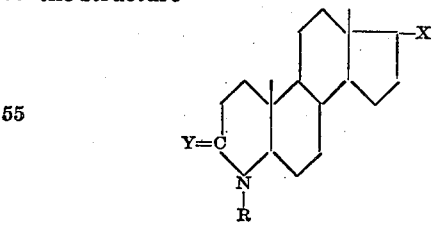

in which, Y is a group from the class consisting of

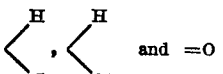

R is a group from the class consisting of H, acyl, alkyl, X is a group from the class consisting of OH, O-acyl, O-alkyl and a carbon containing side chain.

2. The compounds of claim 1 further characterised in that the side chain is that of cholesterol.

3. As new compositions of matter lactams, and derivatives thereof, of compounds having a cyclopentanopolyhydrophenanthrene nucleus having the general formula $C_{26}H_{43}ONYR_2$ and the structure:

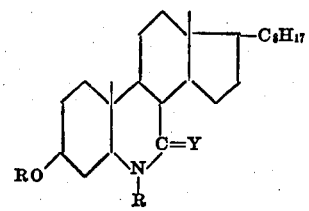

in which, Y is a group from the class consisting of

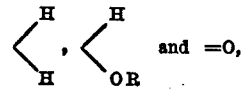

R is a group from the class consisting of H, acyl, alkyl.

4. As new compositions of matter the compounds from the class consisting of the lactam having the general formula $C_{26}H_{45}ON$ and the structure

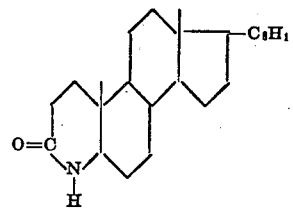

its N-acyl and N-alkyl derivatives.

5. As new compositions of matter the compounds from the class consisting of the lactam having the general formula $C_{18}H_{29}O_2N$ and the structure

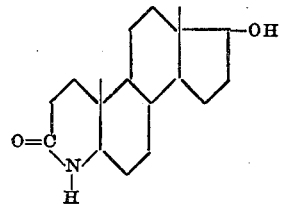

its acyl and alkyl derivatives.

6. A process comprising subjecting to the action of a reducing agent an oximino acid compound having a cyclopentanopolyhydrophenanthrene structure except that one of the hexatomic rings is replaced by a corresponding chain having the terminal groups —COOH and =C=N—OH, the ring system carrying further substituents, at least one, at the carbon atom corresponding to $C_{17}$ in the usual steroid nucleus.

7. A process comprising subjecting to the action of a reducing agent an oximino acid compound having a cyclopentanopolyhydrophenanthrene structure except that one of the hexatomic rings is replaced by a corresponding chain having the terminal groups —COOH and =C=N—OH, the ring system carrying further substituents, at least one, at the carbon atom corresponding to $C_{17}$ in the usual steroid nucleus separating the product and subjecting it to the action of an agent from the class consisting of acylating and alkoxylating agents.

8. A process comprising subjecting to the action of a reducing agent an oximino acid compound having a cyclopentanopolyhydrophenanthrene structure except that one of the hexatomic rings is replaced by a corresponding chain having the terminal groups —COOH and =C=N—OH, the ring system carrying further substituents, at least one, at the carbon atom corresponding to $C_{17}$ in the usual steroid nucleus, separating the product and subjecting it to a further reduction.

9. A process comprising subjecting to the action of a reducing agent an oximino acid compound having a cyclopentanopolyhydrophenanthrene structure except that one of the hexatomic rings is replaced by a corresponding chain having the terminal groups —COOH and =C=N—OH, the ring system carrying further substituents, at least one, at the carbon atom corresponding to $C_{17}$ in the usual steroid nucleus, separating the product, subjecting the same to a further reduction, separating the product and subjecting it to the action of an agent from the class consisting of acylating and alkoxylating agents.

10. The process of claim 6 in which the starting material is the oximino carboxylic acid having the general formula $C_{26}H_{45}O_3N$ and the structure

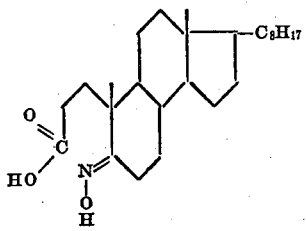

11. The process of claim 6 in which the starting material is the oximino carboxylic acid having the general formula $C_{18}H_{29}O_4N$ and the structure

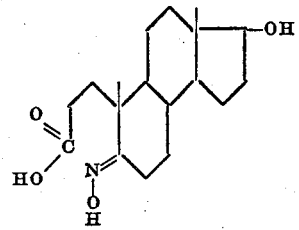

12. The process of claim 6 in which the starting material is the oximino carboxylic acid having the general formula $C_{26}H_{44}O_4NR$ and the structure

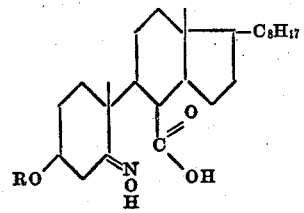

in which R is a group from the class consisting of H and acyl.

CAREL CHRISTOF BOLT.